United States Patent Office 3,396,209
Patented Aug. 6, 1968

3,396,209
AIR DRYING ETHERS OF MONOHYDRIC POLYALLYL ETHERS AND COPOLYMER CONTAINING ALKOXYALKYLATED AMINOTRIAZINE TRANSESTERS
Kazys Sekmakas and Frank Ragas, Chicago, Ill., assignors to De Soto, Inc., a corporation of Delaware
No Drawing. Filed Sept. 28, 1965, Ser. No. 491,049
6 Claims. (Cl. 260—856)

ABSTRACT OF THE DISCLOSURE

An essentially monomeric substantially completely alkoxyalkylated aminotriazine, such as hexamethoxy methyl melamine, is transesterified with a monoethylenically unsaturated carboxylic acid, such as maleic or fumaric acid, to form an unsaturated transester which is copolymerized with other unsaturated material and then reacted with a monohydric polyallyl ether, such as trimethylol propane diallyl ether, to form an air drying ether derivative.

---

The present invention relates to the production of resinous materials, and especially to the production of a single resinous component, stable in the absence of air, and which is capable of curing at low temperature (or even at room temperature in the presence of appropriate driers). The invention is particularly directed to the achievement of a relatively rapid cure of solution coating compositions at moderate temperatures and in the presence of air to provide coatings of extreme hardness and exceptional gloss coupled with extensive solvent insolubility. These air cured products are useful in various utilities such as:

(1) Aerosol spray paint;
(2) Aircraft finish;
(3) Automotive refinish lacquer;
(4) Touch up paint, particularly for appliance finishes;
(5) Maintenance finish;
(6) Clear coatings for metal; and
(7) Coatings on glass for signs.

In accordance with the present invention, the hexamethyl ether of hexamethylol melamine is reacted with one molar proportion of a monoethylenically unsaturated monocarboxylic acid to provide a monoester which is then copolymerized with other monoethylenically unsaturated monomers to form a copolymer. It is important in accordance with the invention to form a transester and not a polymer of the unsaturated acid. Similarly, it is desired to form a copolymer of the transester with other monoethylenically unsaturated monomers so as to build an acrylic-type backbone into the copolymer instead of forming a homopolymer of the unsaturated transester which would have little utility in coating processes. Accordingly, the unsaturated acid which is selected is a monoester of maleic or fumaric acids which has little tendency toward homopolymerization. In this manner, homopolymerization of the unsaturated acid during transester formation and homopolymerization of the transester which is formed are largely eliminated.

The transester copolymers are useful resins per se and they may be used in any desired manner as by reaction with any polyhydric alcohol, especially a resinous polyhydric alcohol such as an alkyd resin or a copolymer of styrene and allyl alcohol or a copolymer containing hydroxy groups such as a copolymer including hydroxy ethyl methacrylate. It is also possible in accordance with the invention to introduce important air drying properties. In preferred practice of the invention, the transester copolymer is reacted with a monohydric polyallyl ether in order to form, by reaction of the single hydroxy group, an air drying ether derivative of the transester copolymer. While polyallyl ethers are preferred, one can also use the corresponding monohydric polyallyl ester of a monoethylenically unsaturated acid such as crotonic acid.

Referring first to the hexamethoxy methyl melamine, it is desired to point out that the starting material is subjected in accordance with the invention to very extensive modification, e.g., it may well be subjected to transesterification, copolymerization, and etherification, and it is still expected to retain its solvent-soluble, non-gelled condition. Accordingly, the hexamethoxy methyl melamine should be essentially monomeric. Desirably, the methoxylation of the compound should be substantially complete and the methoxy groups should be tied up as an ether, the more volatile the better. Thus, and while other alkoxy groups may be used in place of the methoxy group, e.g., the ethoxy, propoxy, or butoxy group, the methoxy group is more reactive and is strongly preferred. Similarly, it is desired to have the transesterification reaction as well as the subsequent etherification reaction proceed as easily as possible and the most volatile alcohol, methanol, is preferably used to form the methyl ether. However, the ethyl, propyl and butyl ethers are also practicable though less desirable. Broadly, any volatile monohydric alcohol may be used to form the ether.

While melamine has been referred to as a particularly preferred triazine, any polyamine and especially any triazine can be used so long as it is substantially completely alkoxy methylated. Stated in different language, all aminotriazines can be used which contain at least two $NH_2$ groups, insofar as they can be converted into the corresponding methylol compounds with formaldehyde and subsequently etherified. For reasons of economy, it is desirable to use the most easily accessible products such as melamine, and also N-phenyl-melamine, benzoguanamine, acetoguanamine, formoguanamine, ammeline, 2:4-diamino-6-chloro-1:3:5-triazine or the like.

It should be noted that the materials which are used in accordance with the invention should be substantially free of hydroxy and amide or amine groups since these tend to interfere with the reactions which are desired in accordance with the invention.

The unsaturated acid should be monoethylenically unsaturated and it must not be one which readily homopolymerizes. It is broadly possible to use maleic, fumaric, or itaconic acids since these have little tendency to form homopolymers, but each molecule of acid is capable of bonding with two molecules of the melamine ether which increases molecular weight. Accordingly, in the preferred practice of the invention, the unsaturated acid which is selected is a half ester of maleic, fumaric, or itaconic acids. Any hydrocarbon radical may be used in the ester formation, but the preferred esters are formed with alcohols containing from 1–8 carbon atoms, most preferably ethyl alcohol and butyl alcohol.

The invention importantly resorts to transesterification because it has been found that the transesterification reaction can proceed with the production of volatile alcohol such as methanol to provide an essentially monomeric transester. In other words, the transesterification reaction is substantially preferential and condensation of the hexamethoxy methyl melamine during the reaction is substantially excluded.

It is also preferred to insure that all of the melamine starting material is available for copolymerization and that all of the copolymerizable monomer copolymerizes with the melamine component. This requires that the hexamethoxy methyl melamine and the unsaturated acid be reacted in substantially equimolar amounts (±20% provides the most preferred form of the invention), and the reaction should be carried through to completion in order that substantially all of the melamine component is in the form of an unsaturated ester and substantially all of the unsaturated acid is eliminated from the system. In this respect, completion of the reaction is easily noted by the substantial elimination of acidity and the reaction can therefore be followed either by following acid number or, and especially when experience with the reaction is obtained, by noting the amount of alcohol removed during the transesterification reaction.

Of course, one can still obtain some of the benefits of the invention by departing from the preferred proportions noted hereinbefore. Thus, one can broadly utilize a mol ratio as low as 0.5 equivalent of acid per mol of aminotriazine. Similarly, and at the sacrifice of some solvent solubility, one can use up to 0.5 equivalent of acid per equivalent of alkoxy group in said aminotriazine.

The transesterification step is preferably carried out under anhydrous conditions and preferably in the absence of inert solvents. An organic solvent medium may be employed if so desired, such as aromatic hydrocarbons or ketones. The transesterification reaction is carried out at a temperature ranging from 100° F. to 350° F. A preferred range is 200° F. to 280° F. Ordinarily, it is preferred to conduct the reaction under a reduced pressure (partial vacuum) in order to speed the removal of the volatile product of the transesterification (the alcohol corresponding to the alkoxy group).

The unsaturated melamine ester per se is a hard and brittle intermediate of limited use. Therefore, this ester is copolymerized with ethylenically unsaturated monomeric materials containing the $CH_2=C<$ group. By appropriately selecting the ratios of unsaturated vinyl or acrylic monomers, the resulting products may range from flexible types to very hard, brittle, mar proof resinous materials. The ethylenically unsaturated monomers capable of copolymerizing with the triazine esters of the invention may be any one of a number of materials having a polymerizable $CH_2=C<$ group, such as vinyl toluene, styrene, ethyl acrylate, butyl acrylate, vinyl acetate, vinyl stearate, 2-ethylhexyl acrylate, and others well known to the art, especially in combinations of monomers producing hard polymers and monomers producing soft polymers.

The copolymerization reaction is a standard solution copolymerization which is conducted in an organic solvent such as toluene or xylene and in the presence of a free-radical generating polymerization catalyst.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of catalysts under consideration is too well known to require extensive discussion, the examples illustrating suitable materials.

The particular nature of the organic solvent used for the solution copolymerization or for the solvent solution application of the products or mixtures containing the same is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

While it is broadly possible to include monomers having reactive functional groups such as carboxyl groups as in acrylic or methacrylic acids, or hydroxy groups as in allyl alcohol, it is not necessary to do this for the copolymer includes the reaction methoxy methyl groups of the melamine starting material and these are wholly adequate for cure. While vinyl monomers are preferred, it is permissible to include proportions of nonvinyl materials such as butene-2, butadiene, maleate esters and unsaturated polyesters, but it is preferred that at least some of the copolymerizable material be within the class of monovinyl compounds as indicated.

To illustrate, the ester copolymers of the invention can be blended with thermoplastic hydroxy-containing resins in weight proportions of from 10/90 and 90/10 to provide thermosetting compositions having excellent hardness, solvent resistance, flexibility, gloss and adhesion. These compositions are particularly suited as coatings for household appliances. The resulting compositions are heat curable to yield very durable thermosetting surface coatings.

When the ester copolymers of the invention are utilized in coatings with resinous polyols, the resulting finishes are highly crosslinked and have excellent solvent resistance and color retention on overbake. In this respect, the rate of reaction of hexamethoxy methyl melamine with polymers having functional groups, such as carboxyl, hydroxy or amino, is approximately twenty times faster than the self condensation of methoxy groups.

When curing with polyhydric resins, it is important to maintain a stoichiometric balance between the methoxy groups in the copolymer and the hydroxy groups in the cross-linking resin. A balance of ±20% is appropriate to avoid a large excess of unreacted methoxy groups which would tend to plasticize the product and decrease its water and chemical resistance.

If the copolymer or the hydroxy-containing resin include free carboxylic acid groups or salts thereof, there may be no need to catalyze the reaction. If one desires to speed the cure or lower the curing temperature, acids such as maleic acid or p-toluene sulfonic acid may be added as an external acid to accelerate the cure.

To illustrate the wide range of hydroxy-containing materials which may be used for the cross-linking cure, attention is directed to the following classes of materials:

(1) Vinyl-hydroxy acrylate copolymers;
(2) Styrene-allyl alcohol copolymers;
(3) Methylol acrylamide copolymers;
(4) Alkyd resins having excess hydroxy groups;
(5) Polyvinyl alcohol;
(6) Cellulose derivatives; and
(7) Polyols, such as hexanetriol, glycerine, etc.

When it is desired to provide air curing systems, a condensation reaction is performed as the last step in the production of the air curing product in order to preserve the unsaturation of the polyallyloxy groups and produce a nongelled, solvent-soluble product which can be applied as a coating.

Thus, and in accordance with the preferred aspects of the invention, at least some of the remaining methoxy groups of the starting melamine component are trans-etherified with a monohydric polyallyloxy compound. The selection of these particular compounds is essential in order to provide a cure in air which will be strongly resistant to solvent attack and which will include a heat and mar resistant surface.

The preferred allyl compounds are monohydric alcohols containing two or more allyloxy, methallyloxy or crotyloxy groups. The preferred compounds are the following: glycerol diallylether, trimethylol propane diallyl ether, pentaerythritol triallyl ether, hexane triol diallyl ether, and the like.

For efficient etherification utilizing the unsaturated allyloxy compound, the presence of an acid catalyst is essential. The acid catalyst may be selected from a wide variety of suitable organic and inorganic acids, such as p-toluene sulfonic acid, sulfuric acid, hydrochloric acid, acetic acid, maleic acid, nitric acid, and the like. Amounts of from 0.05% to 2% may be employed, depending on the nature of the acid catalyst.

The new polyallyl ethers are useful in clear or pigmented coating compositions, as an air drying, film-forming material. Air drying is the property of spontaneously converting upon exposure to air (oxygen) into a coating which is insoluble or only somewhat softened by a solvent in which the starting material is soluble.

It is frequently desirable to incorporate a drier compound in a coating composition containing a resin subject to cure by oxidation in order to speed the autooxidative drying process and, in some instances, to permit the process to take place at room temperature. Cobalt based driers (cobalt naphthenate, linoleate, octoate, resinate, tallate) are preferred, especially for room temperature cure. Cobaltous salts of half esters of dicarboxylic acids are especially preferred (cobaltous butyl phthalate). Conventional paint driers, such as salts and soaps of iron, zirconium, calcium, lead and manganese can also be used, but preferably in addition to a cobalt drier. The preferred proportion of cobalt drier is in the range of 0.01–1.0% by weight of cobalt metal based on the weight of unsaturated compound. Artificially elevated temperatures or higher concentrations of drier generally decrease the drying time.

The invention is illustrated in the examples which follow.

EXAMPLE 1

Production of air drying copolymer ether

PROCEDURE OF PREPARATION

| | Parts by wt. |
|---|---|
| Maleic anhydride (1 equivalent) | 98 |
| n-Butyl alcohol | 74 |
| Heat to 270° F., hold for one hour. Cool to 240° F. Add | |
| Hexamethoxy methyl melamine (6 equivalents) | 390 |
| Theoretical acid value 326, actual acid value 323. Set vacuum on and hold at 220–240° F. while distilling off methanol. Hold for acid value of 15–20. Weight loss 45 grams. Add: | |
| Xylol | 270 |
| Styrene | 107 |
| Butyl acrylate | 530 |
| Azobisisobutyronitrile | 6.6 |
| Premix monomers and catalyst and add over one hour to reactor at 220–230° F. | |
| Azobisisobutyronitrile | 6.0 |
| Add in three portions (2 grams each) after monomer addition is finished (after 1, 2 and 3 hours). Hold for monomer conversion at 230–250° F. for 2 hours. Cool to 200° F. Add | |
| Trimethylol propane diallyl ether (3.3 equivalents) | 710 |
| p-Toluene sulfonic acid | 1.35 |
| Set vacuum and reheat to 240–250° F. Hold for 2–3 hours at 240–250° F. Distill off methanol. Add xylol to 70% non-volatile matter. | |

The final characteristics of the copolymer ether are:

| | |
|---|---|
| Solids (percent) | 69.7 |
| Viscosity (Gardner) | T–U |
| Color (Gardner-Holdt) | 2–3 |

EXAMPLE 2

PROCEDURE OF PREPARATION

| | Parts by wt. |
|---|---|
| Maleic Anhydride | 98 |
| n-Butyl alcohol | 74 |
| Heat to 270° F., hold for one hour. Cool to 240° F. Add | |
| Hexamethyl methyl melamine (6 equivalents) | 390 |
| Theoretical acid value 326, actual acid value 323. Set vacuum on and hold at 220–240° F. while distilling off methanol. Hold for acid value of 15–20. Weight loss 45 grams. Add | |
| Xylol | 270 |
| Styrene | 107 |
| Azobisisobutyronitrile | 6.6 |
| Premix monomers and add over one hour to reactor at 220–230° F. | |
| Azobisisobutyronitrile | 6.0 |
| Add in three portions (2 grams each) after monomer addition is finished (after 1, 2, and 3 hours). Hold for monomer conversion at 230–250° F. for 2 hours. Cool to 200° F. Add | |
| Trimethylol propane diallyl ether (4.7 equivalents) | 1003 |
| p-Toluene sulfonic acid | 1.5 |
| Set vacuum and reheat to 240–250° F. Hold for 2–3 hours at 240–250° F. Add xylol to 70% non-volatile matter. | |

The final characteristics of the copolymer ether are:

| | |
|---|---|
| Solids (percent) | 69.1 |
| Viscosity (Gardner) | V |
| Color (Gardner-Holdt) | 2–3 |

One hundred grams of the solution product of Example 2 are admixed with 2 grams of cobalt naphthenate drier solution (6% cobalt metal). A coating of the resulting polymer is drawn on a steel panel using a doctor knife having a clearance of about 1.5 mils. The wet coated panel is permitted to dry by exposure to air (oxygen) at room temperature (about 78° F.). In about 5 hours, the resulting coating is dry, clear, hard and adherent. After drying for 48 hours at room temperature, the coating is insoluble in xylol.

EXAMPLE 3

Preparation of polymer ether utilizing monoallyl compound

PROCEDURE OF PREPARATION

| | Parts by wt. |
|---|---|
| Maleic anhydride | 98 |
| n-Butyl alcohol | 74 |
| Heat to 270° F., hold for one hour. Cool to 240° F. Add | |
| Hexamethoxy methyl melamine (6 equivalents) | 390 |
| Theoretical acid value 326, actual acid value 323. Set vacuum on and hold at 220–240° F. while distilling off methanol. Hold for acid value of 15–20. Weight loss 45 grams. Add | |
| Xylol | 270 |
| Styrene | 107 |
| Butyl acrylate | 530 |
| Azobisisobutyronitrile | 6.6 |
| Premix monomers and add over one hour to reactor at 220–230° F. | |
| Azobisisobutyronitrile | 6.0 |
| Add in three portions (2 grams each) after monomer addition is finished (after 1, 2, and 3 hours). Hold for monomer conversion at 230–250° F. for 2 hours. Cool to 200° F. Add | |
| Allyl glycolate (4.7 equivalents) | 543 |
| p-Toluene sulfonic acid | 1.5 |
| Set vacuum and reheat to 240–250° F. Hold for 2–3 hours at 240–250° F. Distill off methanol. Add xylol to 70% non-volatile matter. | |

The final characteristics of the polymer ether are:

| | |
|---|---|
| Solids (percent) | 68.9 |
| Viscosity (Gardner) | R–S |
| Color (Gardner-Holdt) | 3 |

One hundred grams of the solution product of this example are admixed with 2 grams of cobalt naphthenate drier solution (containing 2% cobalt metal). A film 1.5 mil thick is drawn on a glass panel. After drying 48 hours at room temperature (78° F.) the coating is soft and tacky and dissolves in xylol.

EXAMPLE 4

This example demonstrates the preparation of materials utilizing a different order of steps. Using this procedure, insoluble gelled products result which are not useful.

PROCEDURE OF PREPARATION

| | Parts by wt. |
|---|---|
| Hexamethoxy methyl melamine (5.23 equivalents) | 340 |
| Trimethylol propane diallyl ether (3.34 equivalents) | 720 |
| Maleic acid (0.31 equivalent) | 36 |

Charge into reactor equipped with an agitator, thermometer, nitrogen inlet tube, and Dean-Stark trap. Heat to 240–285° F. Distill off methanol. Collect 109 grams methanol. Add xylol and monomer blend. Reheat to 210–220° F.

| | |
|---|---|
| Xylol | 980 |
| Styrene | 208 |
| Ethyl acrylate | 208 |
| Benzoyl peroxide | 8.5 |

Polymer gelled after holding 1½ hours at 210° F.

EXAMPLE 5

Example 1 is repeated and terminated prior to the addition of 270 grams of xylol in order to produce the transester of maleic acid half ester with hexamethoxy methyl melamine. The final characteristics of the transester are as follows:

| | |
|---|---|
| Viscosity (Gardner) | $Z_2$–$Z_3$ |
| Color (Gardner-Holdt) | 2 |
| Acid value | 13.6 |

EXAMPLE 6

Preparation of transester copolymer

The following example demonstrates the preparation of a transester copolymer containing reactive methoxy groups in the polymer chain.

PROCEDURE OF PREPARATION

| | Parts by wt. |
|---|---|
| Xylol | 400 |
| Butanol | 100 |

Charge into a reactor equipped with an agitator, thermometer, reflux condenser and an addition funnel. Heat to 250° F.

| | |
|---|---|
| Hexamethoxy methyl melamine maleic acid transester (Example 5) | 300 |

Premix melamine transester with monomers and catalysts and add over 2 hours at 235–245° F.

| | |
|---|---|
| Styrene | 400 |
| Ethyl acrylate | 300 |
| Di-tertiary butyl peroxide | 5 |
| Benzoyl peroxide | 5 |
| Benzoyl peroxide | 3 |

After 2 hours, add 3 grams of benzoyl peroxide. Hold for 3–4 hours for monomer conversion.

| | |
|---|---|
| Xylol | 280 |
| Butanol | 130 |

Add xylol and butanol to 50% solids.

The final characteristics of the copolymer are:

| | |
|---|---|
| Solids (percent) | 50.2 |
| Viscosity (Gardner) | Q–R |
| Color (Gardner-Holdt) | 1 |

EXAMPLE 7

A gloss enamel is prepared having the following composition:

| | Percent |
|---|---|
| Pigment (titanium dioxide rutile) | 28 |
| Non-volatile resin solids | 32 |

Composition of non-volatile resin

70% copolymer of Example 6
30% resinous styrene-allyl alcohol copolyol having the following properties:

| | |
|---|---|
| Hydroxyl content, percent | 5.4–6 |
| Molecular weight | 1600 |
| Equivalent weight | 300±15 |

The enamel is ground in a pebble mill to obtain a 7½ N.S. grind gauge reading. Films of the enamel are drawn on steel panels and baked for 20 minutes at 350° F.

The following results are obtained:

| | |
|---|---|
| Adhesion to metal | Excellent. |
| Pencil hardness | 3H. |
| Forward impact (in./lbs.) | 40. |
| Flexibility (conical mandrel) | Pass ⅛″. |
| Gloss (60°) | 89. |
| Toluol resistance | Excellent. |
| Recoat adhesion | Excellent. |

The above results indicate that the coatings prepared utilizing blends of hydroxy polyols and methoxy melamine copolymers have excellent cure and gloss and result in coatings with very good flexibility, impact and adhesion properties.

Example 8

Preparation of melamine transester utilizing glacial methacrylic acid

This example demonstrates the critical nature of the unsaturated acid type used in the preparation of transesters.

PROCEDURE OF PREPARATION

| | Parts by wt. |
|---|---|
| Hexamethoxy methyl melamine | 390 |
| Glacial methacrylic acid | 86 |
| Hydroquinone | 0.1 |

Heat to 115° F. Solution is clear. Check acid value. Actual acid value 116, theoretical acid value 118. Set vacuum and distill off alcohol at 220–250° F. Final acid value 14.6. Add xylol.

| | |
|---|---|
| Xylol | 210 |
| Styrene | 86 |
| Butyl acrylate | 393 |
| Azobisisobutyronitrile | 9 |

Premix monomers and catalyst. Add monomer at 220° F. After 15 grams of monomer were added, polymer gelled.

Thus, it is shown that replacing 1 mole of maleic acid half ester with methacrylic acid causes the production of an insoluble gelled polymer due to homopolymerization coupled with the high reactivity of methacrylic acid.

To illustrate the curing properties in accordance with the invention, the following resin blends were baked for 20 minutes at 350° F. in order to evaluate the curing properties. All resins contained 0.5% p-toluene sulfonic acid as catalyst.

| Non-Volatile Resin Composition | Xylene Resistance | Gloss | Flexibility | Marproof | Note |
|---|---|---|---|---|---|
| 100% Example 6 | Poor | V. good | V. good | Poor | Thermoplastic film. |
| 80% Example 6, 20% Copolyol Ex. 7 | Good | do | do | Good | Thermoplastic film. |
| 70% Example 6, 30% Copolyol Ex. 7 | Excellent | do | do | Excellent | Thermosetting film. |
| 70% Example 6, 30% Typical Methylolated Acrylamide Polymer | do | do | do | do | Do. |

We claim:

1. An addition copolymer comprising a transester produced by transesterifying an essentially monomeric substantially completely alkoxyalkylated aminotriazine containing at least two $NH_2$ groups with a monoethylenically unsaturated carboxylic acid from the group consisting of maleic acid, fumaric acid, itaconic acid, and half esters thereof with monohydric alcohols, there being at least 0.5 equivalent of said acid per mol of said aminotriazine, up to 0.5 equivalent of said acid per equivalent of said alkoxy group in said aminotriazine, and at least one other monoethylenically unsaturated material copolymerizable with said transester, said copolymer being reacted with a monohydric polyallyl ether to form an air drying ether derivative.

2. The product of claim 1 in which said alkoxyalkylated aminotriazine is the hexamethyl ether of hexamethylol melamine.

3. The product of claim 2 in which one molar proportion of said acid is reacted per mol of said ether to provide a monoester.

4. The product of claim 2 in which said acid is a monoester of a dicarboxylic acid selected from the group consisting of maleic acid and fumaric acid.

5. The product of claim 4 in which said monoester is with a monohydric alcohol containing from 1–8 carbon atoms.

6. An addition copolymer as recited in claim 1 in which said monoethylenically unsaturated compound contains the $CH_2{=}C{<}$ group.

References Cited

UNITED STATES PATENTS

| | | | |
|---|---|---|---|
| 2,829,119 | 4/1958 | Dudley et al. | 260—67.6 |
| 2,871,209 | 1/1959 | Shelley | 260—67.6 |
| 2,885,382 | 5/1959 | Zuppinger et al. | 260—67.6 |
| 2,986,541 | 5/1961 | Zuppinger et al. | 260—67.6 |
| 3,018,265 | 1/1962 | Tessmar | 260—856 |
| 3,298,978 | 1/1967 | Rutherford | 260—856 |

GEORGE F. LESMES, *Primary Examiner.*

JOHN C. BLEUTGE, *Assistant Examiner.*

UNITED STATES PATENT OFFICE
CERTIFICATE OF CORRECTION

Patent No. 3,396,209

August 6, 1968

Kazys Sekmakas et al.

It is certified that error appears in the above identified patent and that said Letters Patent are hereby corrected as shown below:

Column 2, line 21, "ettherification" should read -- etherification --. Column 3, line 74, "reaction" should read -- reactive --. Column 4, line 9, "and" should read -- to --. Column 5, line 19, cancel "in"; line 69, "Hexamethyl" should read -- Hexamethoxy --; line 75, after "Styrene---107" insert -- Butyl Acrylate------530 --.

Signed and sealed this 20th day of January 1970.

(SEAL)
Attest:

Edward M. Fletcher, Jr.
Attesting Officer

WILLIAM E. SCHUYLER, JR.
Commissioner of Patents